US012663072B2

(12) United States Patent
    Tsuchida

(10) Patent No.:  US 12,663,072 B2
(45) Date of Patent:      Jun. 23, 2026

(54) POWER TRANSMISSION DEVICE

(71) Applicants:JATCO Ltd, Fuji (JP); NISSAN MOTOR CO., LTD., Yokohama (JP)

(72) Inventor:  Akira Tsuchida, Sagamihara (JP)

(73) Assignees: JATCO Ltd, Fuji (JP); NISSAN MOTOR CO., LTD., Yokohama (JP)

( * ) Notice:  Subject to any disclaimer, the term of this patent is extended or adjusted under 35 U.S.C. 154(b) by 0 days.

(21) Appl. No.:  19/101,425

(22) PCT Filed:  Jun. 28, 2023

(86) PCT No.:  PCT/JP2023/023942
    § 371 (c)(1),
    (2) Date:  Feb. 5, 2025

(87) PCT Pub. No.: WO2024/034282
    PCT Pub. Date:Feb. 15, 2024

(65) Prior Publication Data
    US 2026/0036197 A1      Feb. 5, 2026

(30) Foreign Application Priority Data

Aug. 8, 2022   (JP) ................................ 2022-126642

(51) Int. Cl.
    *F16H 57/04*        (2010.01)
    *F16H 1/20*         (2006.01)
        (Continued)
(52) U.S. Cl.
    CPC ........... *F16H 57/0457* (2013.01); *F16H 1/20* (2013.01); *F16H 57/021* (2013.01);
        (Continued)

(58) Field of Classification Search
    CPC ............... F16H 57/045; F16H 57/0457; F16H 57/0423; F16H 57/027
    See application file for complete search history.

(56) References Cited

U.S. PATENT DOCUMENTS

| | | | |
|---|---|---|---|
| 11,486,486 B2 * | 11/2022 | Trinh | .................. F16H 57/0423 |
| 11,761,529 B2 * | 9/2023 | Nonoyama | ........... F16H 57/027 74/606 R |

(Continued)

FOREIGN PATENT DOCUMENTS

| | | | | |
|---|---|---|---|---|
| JP | 2004-180477 A | | 6/2004 | |
| JP | 2005201316 A | * | 7/2005 | ......... F16H 57/0447 |

(Continued)

*Primary Examiner* — Jake Cook
(74) *Attorney, Agent, or Firm* — Foley & Lardner LLP

(57)            ABSTRACT

A power transmission device includes a case including an oil reservoir at a lower portion thereof, and a first shaft, a second shaft, and a third shaft which are shaft-supported by the case. The case includes an air breather chamber that separates air and an oil in the case and communicates with the atmosphere, an oil catch tank that reserves an oil raked up by a third gear portion of the third shaft, and an oil guide that introduces the oil raked up by the third gear portion into the oil catch tank. The air breather chamber is provided above and near the third shaft. The oil catch tank is provided above and near the first shaft. The oil guide is provided above the second shaft. The second shaft is disposed outside the oil reservoir in the case.

4 Claims, 3 Drawing Sheets

(51) Int. Cl.
   *F16H 57/021* (2012.01)
   *F16H 57/027* (2012.01)

(52) U.S. Cl.
   CPC ....... *F16H 57/027* (2013.01); *F16H 57/0423* (2013.01); *F16H 57/0424* (2013.01); *F16H 57/045* (2013.01); *F16H 57/0471* (2013.01)

(56) References Cited

U.S. PATENT DOCUMENTS

| | | | |
|---|---|---|---|
| 11,828,358 B2 * | 11/2023 | Nakata | F16H 57/0424 |
| 2004/0154846 A1 | 8/2004 | Kira | |
| 2019/0107191 A1 * | 4/2019 | Ogawa | F16H 57/0457 |
| 2022/0049768 A1 * | 2/2022 | Nakamatsu | F16H 57/0457 |

FOREIGN PATENT DOCUMENTS

| | | | | |
|---|---|---|---|---|
| JP | 2021162132 A | * | 10/2021 | |
| JP | 2022064684 A | * | 4/2022 | |
| KR | 20220012091 A | * | 2/2022 | F16H 57/0412 |

* cited by examiner

POWER TRANSMISSION DEVICE

TECHNICAL FIELD

The present invention relates to a power transmission device.

BACKGROUND ART

Patent Document 1 discloses a motor cooling structure in which a counter shaft is disposed in an oil reservoir.

PRIOR ART DOCUMENT

Patent Document

Patent Document 1: JP 2004-180477 A (for example, see FIG. 4)

SUMMARY OF INVENTION

A power transmission device may include, in addition to an oil reservoir at a lower portion of a case, an air breather chamber and an oil catch tank in the case. The air breather chamber separates air and an oil in the case and communicates with an atmosphere. The oil catch tank reserves an oil raked up by a gear portion of a shaft immersed in the oil reservoir. The oil catch tank is used, for example, for lowering an oil level of the oil reservoir when a device is driven by reserving the oil. When the oil level is lowered, stirring resistance of the shaft immersed in the oil reservoir is reduced, thereby improving power transmission efficiency of the device.

However, the air breather chamber and the oil catch tank can restrict arrangement of the shaft of the power transmission device. Therefore, depending on the arrangement of the air breather chamber and the oil catch tank, the shaft, which does not necessarily need to be immersed in the oil reservoir, may be forced to be immersed in the oil reservoir, which may result in increased stirring resistance.

The present invention has been made in view of such a problem, and an object thereof is to improve stirring resistance of a shaft in an oil reservoir.

A power transmission device according to an aspect of the present invention includes a case including an oil reservoir at a lower portion thereof, and a first shaft, a second shaft, and a third shaft which are shaft-supported by the case. The first shaft is connected to a power source and includes a first gear portion which outputs power from the power source. The second shaft includes a second gear portion which receives power from the first gear portion and which outputs the received power. The third shaft includes a third gear portion which receives power from the second gear portion and which has at least a part immersed in the oil reservoir. The case includes an air breather chamber that separates air and an oil in the case and communicates with the atmosphere, an oil catch tank that reserves an oil raked up by the third gear portion, and an oil guide that introduces the oil raked up by the third gear portion into the oil catch tank. The air breather chamber is provided above and near the third shaft. The oil catch tank is provided above and near the first shaft. The oil guide is provided above the second shaft. The second shaft is disposed outside the oil reservoir in the case.

According to this aspect, when power is transmitted from a first shaft to a third shaft via a second shaft, an air breather chamber is provided above and near the third shaft, and an oil catch tank is provided above and near the first shaft.

Further, an oil raked up by a third gear portion is introduced into the oil catch tank by an oil guide provided above the second shaft. Accordingly, the second shaft can be provided in an upper space inside a case between the first shaft and the third shaft, and the second shaft is disposed outside an oil reservoir. As a result, stirring resistance of a shaft can be reduced as compared with a case in which the second shaft is immersed in the oil reservoir, and the stirring resistance of the shaft in the oil reservoir can be improved.

DESCRIPTION OF EMBODIMENTS

Hereinafter, an embodiment of the present invention will be described with reference to the accompanying drawings.

Figure 1:
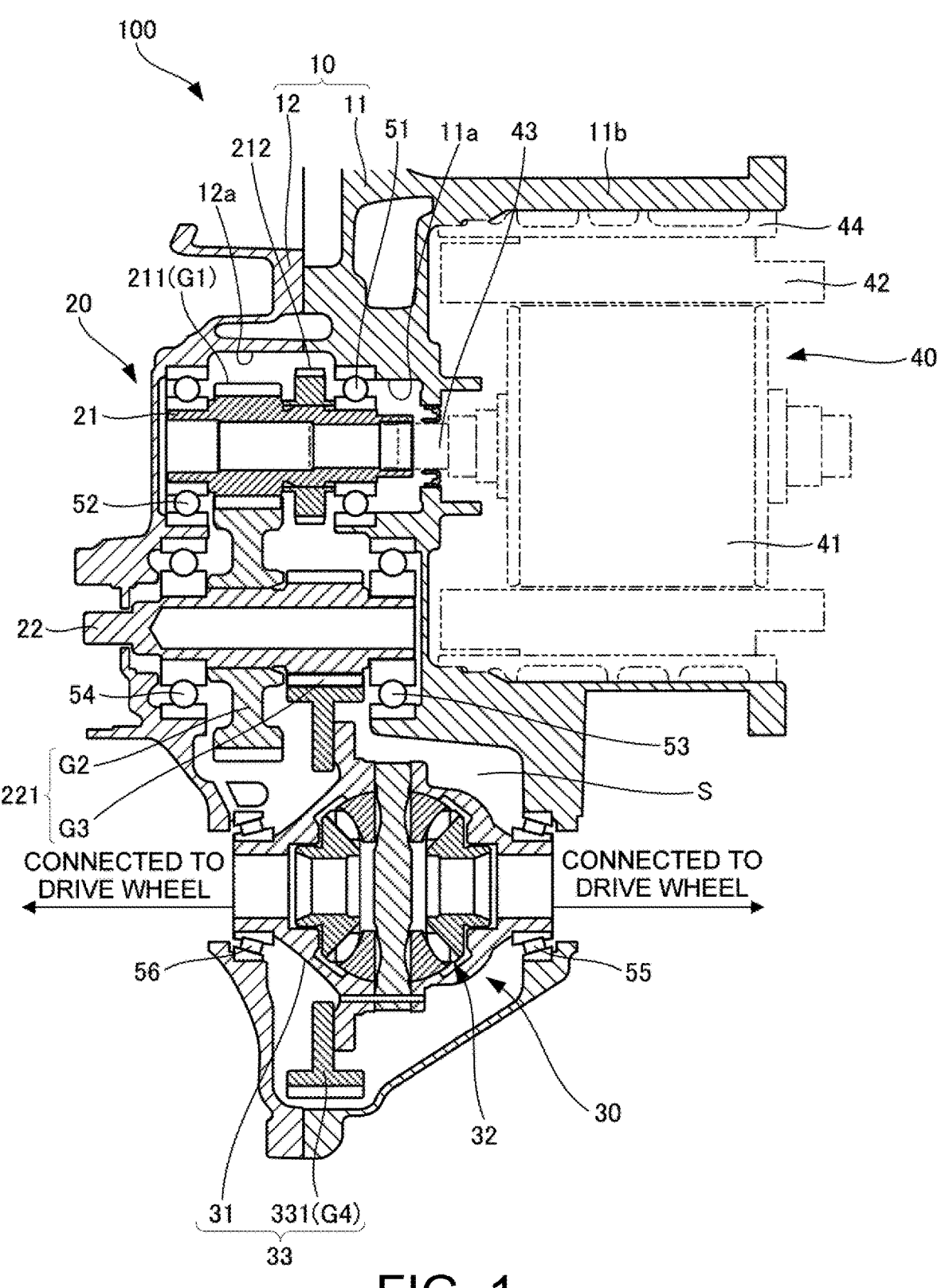
FIG. 1 is a schematic configuration diagram of a power transmission device according to an embodiment.

FIG. 1 is a schematic configuration diagram of a power transmission device 100 according to the present embodiment. In FIG. 1, a rotating electrical machine 40 is indicated by a two-dot dashed line. As shown in FIG. 1, the power transmission device 100 includes a case 10, a deceleration mechanism 20, and a differential gear 30. The power transmission device 100 is mounted on a vehicle. The vehicle is an electric vehicle using the rotating electrical machine 40 as a power source. The power transmission device 100 transmits power from the rotating electrical machine 40 to drive wheels. The power transmission device 100 can also transmit power from the drive wheels to the rotating electrical machine 40.

The case 10 includes a case body 11 and a cover 12. The case body 11 is provided on one side (right side in FIG. 1) in an axial direction, and the cover 12 is provided on the other side (left side in FIG. 1) in the axial direction. The axial direction is an extending direction of a shaft (power transmission shaft) of the power transmission device 100, and each of extending directions of a first shaft 21, a second shaft 22, and a third shaft 33 to be described later corresponds to the axial direction.

The case body 11 has an accommodating portion 11a, and the cover 12 has an accommodating portion 12a. The accommodating portion 11a opens toward the left side in FIG. 1, and the accommodating portion 12a opens toward the right side in FIG. 1. The cover 12 is provided in the case body 11, and closes an opening of the accommodating portion 11a with an opening of the accommodating portion 12a. A space formed by the accommodating portion 11a and the accommodating portion 12a constitutes an accommodating chamber S of the case 10. The accommodating chamber S is formed by mating the case body 11 and the cover 12 with each other.

The case body 11 further includes a cylindrical portion 11b. The cylindrical portion 11b is provided on the right side in FIG. 1 with respect to the accommodating portion 11a. The rotating electrical machine 40 is disposed in the cylindrical portion 11b. Therefore, the power transmission device 100 can be also understood as a configuration further including the rotating electrical machine 40. The rotating electrical machine 40 is fixed to an inner periphery of the cylindrical portion 11b.

The rotating electrical machine 40 includes a rotor 41, a stator 42, a rotary shaft 43, and a motor case 44. The rotor 41 is accommodated in the stator 42, and the stator 42 is fixed to the inner periphery of the cylindrical portion 11b via the motor case 44. The rotary shaft 43 protrudes into the accommodating portion 11a through a through hole penetrating a partition wall between an inside of the accommodating portion 11a and an inside of the cylindrical portion 11b, and a seal member is provided between the through hole and the rotary shaft 43. Therefore, the inside of the cylindrical portion 11b as a space in which the rotating electrical machine 40 is disposed is separated from the accommodating chamber S that is a space in which the deceleration mechanism 20 and the differential gear 30 are disposed, and does not constitute the accommodating chamber S.

The deceleration mechanism 20 is a gear mechanism, and includes the first shaft 21 and the second shaft 22. The first shaft 21 is connected to the rotating electrical machine 40. The first shaft 21 is connected to the rotating electrical machine 40 in a power transmittable manner. This connection may be connection performed via other configurations (for example, a clutch or another gear mechanism). In the present embodiment, the first shaft 21 is directly connected to the rotating electrical machine 40 by being directly connected to the rotary shaft 43. The phrase "the first shaft 21 is directly connected to the rotating electrical machine 40" means that the first shaft 21 is disposed on an axis of the rotating electrical machine 40 and is directly connected to the rotating electrical machine 40 without using a clutch or another gear mechanism.

The first shaft 21 includes a first gear portion 211. The first gear portion 211 is constituted by a first gear G1. The first gear portion 211 is integrally formed with the first shaft 21, and outputs the power from the rotating electrical machine 40. The first shaft 21 is shaft-supported on the case 10 by being supported by the case body 11 via a bearing 51 on one side in the axial direction and by being supported by the cover 12 via a bearing 52 on the other side in the axial direction. A park gear 212 is also provided on the first shaft 21 in a portion between the first gear portion 211 and the bearing 51. The first shaft 21 constitutes a first shaft of the power transmission device 100.

The second shaft 22 includes a second gear portion 221. The second gear portion 221 includes a second gear G2 and a third gear G3. The second gear G2 is integrally formed with the second shaft 22 by press-fitting, and the third gear G3 is integrally formed with the second shaft 22. The third gear G3 is disposed on the right side of FIG. 1 with respect to the second gear G2, that is, on the side closer to the rotating electrical machine 40. The second gear G2 meshes with the first gear G1, and power is input from the first gear G1 to the second gear G2.

The power input to the second gear G2 is output from the third gear G3. Therefore, the second gear portion 221 receives the power from the first gear G1 and outputs the received power. The second gear G2 has a larger number of teeth than those of the first gear G1, and constitutes a first deceleration gear stage together with the first gear G1. The second shaft 22 is shaft-supported on the case 10 by being supported by the case body 11 via a bearing 53 on one side in the axial direction and by being supported by the cover 12 via a bearing 54 on the other side in the axial direction. The second shaft 22 constitutes a second shaft of the power transmission device 100.

The differential gear 30 is a differential gear mechanism, and includes a differential case 31, a fourth gear G4 as a final gear, and a differential portion 32. The differential case 31 is shaft-supported on the case 10 by being supported by a bearing 55 provided in the case body 11 and a bearing 56 provided in the cover 12. The fourth gear G4 is coaxially fixed to an outer wall portion of the differential case 31. The fourth gear G4 meshes with the third gear G3, and power is input to the fourth gear G4 from the third gear G3. The differential case 31 constitutes the third shaft 33 of the power transmission device 100 together with the fourth gear G4. The fourth gear G4 constitutes a third gear portion 331 of the third shaft 33.

The differential case 31 accommodates the differential portion 32, and the differential portion 32 distributes and outputs power input to the differential case 31 via the fourth gear G4 to the drive wheels in a left-right direction of the vehicle. Therefore, the fourth gear G4 as the third gear portion 331 is connected to the drive wheels via the differential case 31 and the differential portion 32, and transmits the input power to the drive wheels.

The fourth gear G4 has a larger number of teeth than those of the third gear G3, and constitutes a second deceleration gear stage together with the third gear G3. Therefore, in the power transmission device 100, deceleration in two stages is performed by the first gear G1 and the second gear G2, and the third gear G3 and the fourth gear G4.

The power transmission device 100 is a power transmission device having a three-shaft configuration in which a total of three shafts, that is, the first shaft 21, the second shaft 22, and the third shaft 33, are disposed as the power transmission shafts in the accommodating chamber S. The shafts of the power transmission device 100 are implemented by a plurality of shafts that are sequentially connected from a radial direction by meshing of the gear portions.

Figure 2:
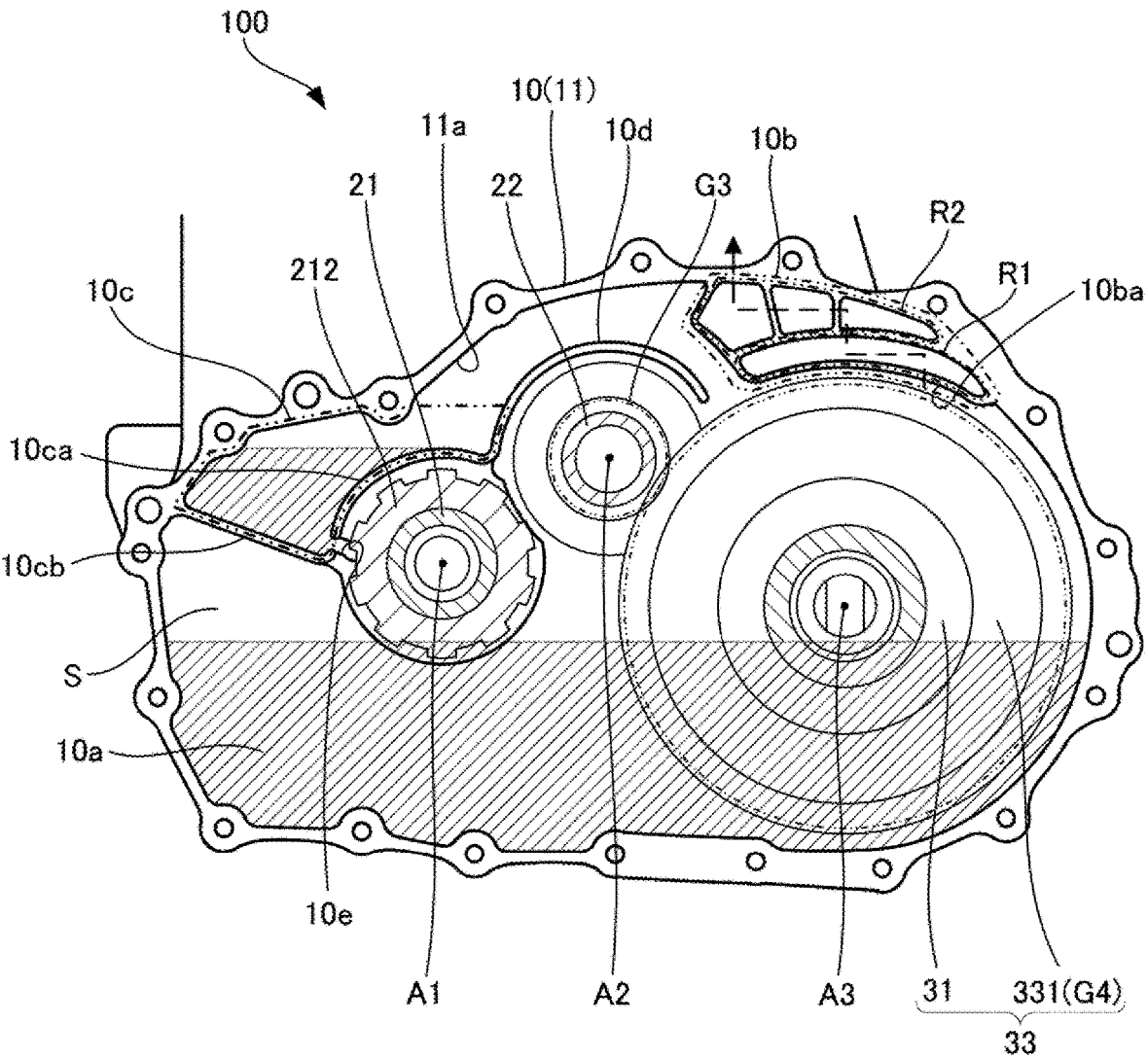
FIG. 2 is a view of an inside of a case seen from a cover side as viewed in an axial direction.

FIG. 2 is a view of the accommodating chamber S seen from a cover 12 side as viewed in the axial direction. In FIG. 2, the accommodating chamber S is shown by a cross section taken along a mating surface between the case body 11 and the cover 12. Therefore, FIG. 2 illustrates the inside of the accommodating portion 11a of the case body 11 as the accommodating chamber S. In FIG. 2, an up-down direction corresponds to the direction of gravity, and a left-right direction corresponds to a front-rear direction of the vehicle.

As shown in FIG. 2, the case 10 includes an oil reservoir 10a, an air breather chamber 10b, an oil catch tank 10c, and an oil guide 10d. Wall portions forming these configurations 10a to 10d are also formed on the cover 12 side, and these configurations 10a to 10d are configured in the case 10 in a state in which the case body 11 and the cover 12 are mated.

The oil reservoir 10a is provided in a lower portion of the case 10. An oil in the oil reservoir 10a is used for raking up circulation, and a raked-up oil is stored again in the oil reservoir 10a, for example, by dropping due to an action of gravity after being used for lubrication. The fourth gear G4 is immersed in the oil reservoir 10a to rake up the oil in the oil reservoir 10a. In FIG. 2, an oil level height when a device is driven is shown as an oil level height of the oil reservoir 10a. The fourth gear G4 is disposed at a height at which most of a lower half thereof is immersed in the oil reservoir 10a when the device is driven. The fourth gear G4 is provided at a height at which at least a part thereof is immersed in the oil reservoir 10a regardless of whether the device is being driven or stopped.

The air breather chamber 10b is provided in the case 10, separates air and an oil in the accommodating chamber S, and communicates with the atmosphere. The inside of the case 10 is formed as a space surrounded by an outer wall portion (wall portion constituting an outer wall of the case 10) of the case 10, and the accommodating chamber S is separated as a space in which the deceleration mechanism 20 and the differential gear 30 are disposed in the case 10.

The air breather chamber 10b is provided above and near the third shaft 33. The terms "above" and "below" refer to disposing that appears to overlap in the direction of gravity when viewed in a predetermined direction including the axial direction and the radial direction. For example, when a first element overlaps with a second element in the direction of gravity when viewed in the axial direction, if a position of the first element is higher than that of the second element, the first element is above the second element. In this case, the first element and the second element may overlap with each other or be offset when viewed in the radial direction.

The air breather chamber 10b is provided above the third shaft 33 by having a portion overlapping with the third shaft 33 in the direction of gravity at a position higher than the third shaft 33, that is, an overlapped portion in the direction of gravity. The air breather chamber 10b is provided within a range that does not protrude from the fourth gear G4 in the left-right direction of FIG. 2. The air breather chamber 10b is provided at a position higher than the fourth gear G4 at each position in the left-right direction of FIG. 2, so that the air breather chamber 10b is provided at the position higher than the fourth gear G4 as a whole.

The air breather chamber 10b includes a wall portion 10ba that has a curved shape along the third shaft 33. The air breather chamber 10b is provided to have, for example, such a curved shape with respect to the third shaft 33, and is accordingly provided as close to the third shaft 33 as possible, and thus the air breather chamber 10b is provided near the third shaft 33. The wall portion 10ba constitutes a lower wall portion of the air breather chamber 10b, and a curved shape of the wall portion 10ba is a shape along the fourth gear G4 which is a maximum outer diameter portion of the third shaft 33.

The air breather chamber 10b has a front defense chamber R1 and a labyrinth chamber R2. In the air breather chamber 10b, the front defense chamber R1 is located on a lower side in the direction of gravity, and the labyrinth chamber R2 is located on an upper side in the direction of gravity. A plurality of walls are provided in the labyrinth chamber R2 on the case body 11 side and the cover 12 side, alternately arranged in the front-rear direction of the vehicle, that is, in the left-right direction in the figure, and a labyrinth passage is formed by the plurality of walls. An arrow indicated by a dashed line indicates a flow path of air passing through the air breather chamber 10b, and air in the accommodating chamber S passes through the air breather chamber 10b as follows.

That is, the front defense chamber R1 communicates with the accommodating chamber S on the cover 12 side, and the air first flows into the front defense chamber R1, and then flows into the labyrinth chamber R2 via the front defense chamber R1. The front defense chamber R1 allows the air to flow before the air flows into the labyrinth chamber R2, thereby preventing oil from flowing into the labyrinth chamber R2. Oil can be discharged from the front defense chamber R1 to the accommodating chamber S via a discharge hole. In the labyrinth chamber R2, the air is separated from the oil by flowing through the labyrinth passage. The labyrinth chamber R2 communicates with the atmosphere on the cover 12 side, and the air is discharged to the atmosphere after flowing through the labyrinth chamber R2.

The oil catch tank 10c is provided above and near the first shaft 21 in the case 10. The oil catch tank 10c is provided above the first shaft 21 by having a portion overlapping with the first shaft 21 in the direction of gravity. The oil catch tank 10c is provided in a manner of protruding from the first shaft 21 on a side away from the third shaft 33 in the left-right direction of the figure, that is, on the left side of the figure. Therefore, in the oil catch tank 10c, a portion that does not protrude from the first shaft 21 in the left-right direction of the figure is provided above the first shaft 21. A portion of the oil catch tank 10c that protrudes from the first shaft 21 in the left-right direction of the figure, that is, a portion of the oil catch tank 10c that does not overlap with the first shaft 21 in the direction of gravity, is provided at a position higher than an axis A1 of the first shaft 21.

The oil catch tank 10c includes a wall portion 10ca has a curved shape along the first shaft 21. The oil catch tank 10c is provided near the first shaft 21 by, for example, being provided so close that the wall portion 10ca has a curved shape along the first shaft 21 in this manner. The curved shape of the wall portion 10ca is a shape along the park gear 212 which is the maximum outer diameter portion of the first shaft 21.

The wall portion 10ca extends downward while curving toward the left side in the figure, and is connected to a wall portion 10cb. The wall portion 10cb extends obliquely upward toward the left side of the figure from a connection portion with the wall portion 10ca, and connects to an outer wall portion that constitutes the accommodating portion 11a. The wall portion forms the oil catch tank 10c together with the wall portion 10ca and the wall portion 10cb. The wall portion 10cb constitutes a bottom portion of the oil catch tank 10c together with the wall portion 10ca.

The wall portion 10ca has a top portion at a position corresponding to the axis A1 of the first shaft 21 in the left-right direction of the figure, and extends downward while curving on a side closer to the third shaft 33 than the top portion, that is, on the right side of the figure. The wall portion 10ca is connected to the oil guide 10d on the right side of the top portion in the figure.

As described above, in an upper region of the accommodating chamber S between the first shaft 21 and the third shaft 33, a space is created by providing the air breather chamber 10b above and near the third shaft 33, and by providing the oil catch tank 10c above and near the first shaft 21. Therefore, the second shaft 22 is disposed in the space, and therefore the second shaft 22 is disposed in the accommodating chamber S outside the oil reservoir 10a, that is, in the air. As a result, stirring resistance of the shaft is prevented compared to when the second shaft 22 is immersed in the oil reservoir 10a. The second shaft 22 is disposed outside the oil reservoir 10a regardless of whether the device is being driven or stopped. The second shaft 22 may be provided at a height that allows the second shaft 22 to be located outside the oil reservoir 10a at least while the device is driven, out of the two periods in which the device is driven and stopped.

An axis A2 of the second shaft 22 disposed as described above is set at a position higher than the axis A1 of the first shaft 21 and an axis A3 of the third shaft 33. The first shaft 21 and the third shaft 33 are arranged side by side in the left-right direction of the figure. It is preferable that the first shaft 21 is provided at a height such that the first shaft 21 is not immersed in the oil reservoir 10a when the device is driven. Therefore, the axis A1 of the first shaft 21 is set at a position slightly higher than the axis A3 of the third shaft 33.

The oil catch tank 10*c* is provided above and near the first shaft 21 and reserves the oil raked up by the fourth gear G4. That is, the oil catch tank 10*c* is provided at a position away from the fourth gear G4.

Therefore, the oil guide 10*d* is provided above the second shaft 22. The oil guide 10*d* introduces the oil raked up by the fourth gear G4 into the oil catch tank 10*c*. Accordingly, even if the oil catch tank 10*c* is provided above and near the first shaft 21, the oil raked up by the fourth gear G4 can be captured by the oil catch tank 10*c*.

The oil guide 10*d* has a plate shape and is provided in the accommodating chamber S. The oil guide 10*d* is provided above the second shaft 22 by having a portion that overlaps with the second shaft 22 in the direction of gravity at a position higher than the second shaft 22. The oil guide 10*d* is provided near the second shaft 22 and has a curved shape along the second shaft 22. This shape is curved along the second gear G2, which is a maximum outer diameter portion of the second shaft 22. The oil guide 10*d* extends downward while curving toward the left side of the figure, and is connected to the wall portion 10*ca*. The oil guide 10*d* includes a top portion at a position corresponding to the axis A2 of the second shaft 22 in the left-right direction of the figure, and extends downward while curving from the top portion to the right of the figure within a range that does not interfere with the fourth gear G4.

A part of the oil guide 10*d* may also serve as a wall portion of the oil catch tank 10*c*. That is, a part of the oil guide 10*d* may function as the wall portion of the oil catch tank 10*c*. Accordingly, the oil catch tank 10*c* is further formed by the part of the oil guide 10*d*. As a result, the oil catch tank 10*c* is provided above the first shaft 21 so as to have a portion that overlaps with the axis A1 of the first shaft 21 in the direction of gravity at a position higher than the first shaft 21.

An oil passage 10*e* is formed in the case 10. The oil passage 10*e* opens into the bottom portion of the oil catch tank 10*c* and introduces an oil reserved in the oil catch tank 10*c* to the bearing 51 which is a bearing that supports the first shaft 21. The oil passage 10*e* is formed in the case body 11. A similar oil passage may be provided in the cover 12, for example. In this case, the oil can be introduced into the bearing 52 from the oil catch tank 10*c*.

Next, main functions and effects of the present embodiment will be described.

Figure 3:
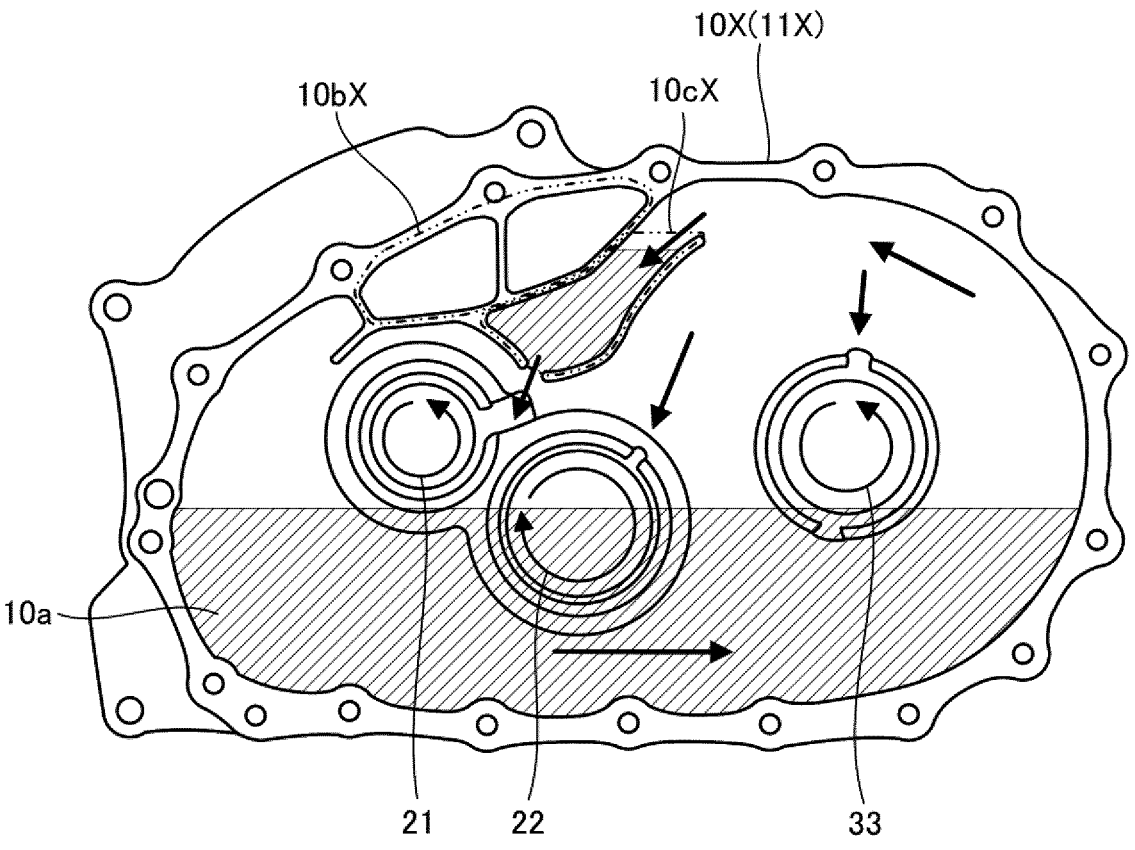
FIG. 3 is a diagram showing a comparative example.

FIG. 3 is a diagram showing a comparative example. FIG. 3 shows a case 10X as the comparative example. The case 10X includes a case body 11X provided with an air breather chamber 10*b*X and an oil catch tank 10*c*X which are different in arrangement and the like from those of the present embodiment. In FIG. 3, the first shaft 21, the second shaft 22, and the third shaft 33 are diagrammatically indicated by arrows indicating rotation directions.

In this example, the air breather chamber 10*b*X and the oil catch tank 10*c*X are provided in the upper region in the case 10 between the first shaft 21 and the third shaft 33. The oil catch tank 10*c*X opens toward an oil scattered from the rotating third shaft 33. Therefore, in this example, a part of the oil raked up by the third shaft 33 can be directly captured in the oil catch tank 10*c*X. Further, the oil reserved in the oil catch tank 10*c*X can also be used for lubricating the bearing 51 that supports the first shaft 21.

However, in this example, there is no space to dispose the second shaft 22 in the upper region of the case 10 between the first shaft 21 and the third shaft 33, so the second shaft 22 is forced to be immersed in the oil reservoir 10*a*. As a result, stirring resistance acts not only on the third shaft 33 but also on the second shaft 22 when the device is driven, and power transmission efficiency thereof deteriorates accordingly. In contrast to this, the power transmission device 100 according to the present embodiment is configured as follows.

(1) The power transmission device 100 includes the case 10 including the oil reservoir 10*a* at a lower portion thereof, and the first shaft 21, the second shaft 22, and the third shaft 33 that are shaft-supported by the case 10. The first shaft 21 is connected to the rotating electrical machine 40. The first shaft 21 includes the first gear portion 211 which outputs the power from the rotating electrical machine 40. The second shaft 22 includes the second gear portion 221 which receives the power from the first gear portion 211 and which outputs the received power. The third shaft 33 includes the third gear portion 331 which receives the power from the second gear portion 221 and which has at least a part immersed in the oil reservoir 10*a*. The case 10 includes the air breather chamber 10*b* that separates the air and the oil of the accommodating chamber S in the case 10 and communicates with the atmosphere, the oil catch tank 10*c* that reserves an oil raked up by the third gear portion 331, and the oil guide 10*d* that introduces the oil raked up by the third gear portion 331 into the oil catch tank 10*c*. The air breather chamber 10*b* is provided above and near the third shaft 33. The oil catch tank 10*c* is provided above and near the first shaft 21. The oil guide 10*d* is provided above the second shaft 22. The second shaft 22 is disposed outside the oil reservoir 10*a* in the case 10.

According to such a configuration, when the power is transmitted from the first shaft 21 to the third shaft 33 via the second shaft 22, the air breather chamber 10*b* is provided above and near the third shaft 33, and the oil catch tank 10*c* is provided above and near the first shaft 21. Further, the oil raked up by the third gear portion 331 is introduced into the oil catch tank 10*c* by the oil guide 10*d* provided above the second shaft 22. Accordingly, the second shaft 22 can be provided in the upper region in the case 10 between the first shaft 21 and the third shaft 33, and the second shaft 22 is disposed outside the oil reservoir 10*a*. As a result, the stirring resistance of the shaft can be reduced as compared with the case in which the second shaft 22 is immersed in the oil reservoir 10*a*, and the stirring resistance of the shaft in the oil reservoir 10*a* can be improved.

(2) In the present embodiment, the total of three shafts, that is, the first shaft 21, the second shaft 22, and the third shaft 33, are disposed as the power transmission shafts in the case 10. When the power transmission device 100 is configured in this manner, it is of great technical significance in that the stirring resistance that can occur in the oil reservoir 10*a* due to the arrangement of the second shaft 22 can be improved.

(3) The case 10 further has the oil passage 10*e* for introducing the oil reserved in the oil catch tank 10*c* to the bearing 51 that supports the first shaft 21. Accordingly, it is possible not only to reserve the oil in the oil catch tank 10*c* in order to lower the oil level of the oil reservoir 10*a* when the device is driven, but also to discharge the reserved oil from the oil catch tank 10*c* while effectively using the reserved oil for lubrication. Therefore, even if the oil catch tank 10*c* is provided above and near the first shaft 21, the oil catch tank 10*c* can be used for lowering the oil level in the oil reservoir 10*a* and for lubrication when the device is driven.

Although the embodiment of the present invention has been described above, the above embodiment merely exemplifies some of application examples of the present invention and does not intend to limit the technical scope of the present invention to the specific configurations of the above embodiment.

The present application claims a priority based on Japanese Patent Application No. 2022-126642 filed with the Japan Patent Office on Aug. 8, 2022, all the contents of which are hereby incorporated by reference.

DESCRIPTION OF REFERENCE SIGNS

10 case
10*a* oil reservoir
10*b* air breather chamber
10*c* oil catch tank
10*d* oil guide
10*e* oil passage
21 first shaft
211 first gear portion
22 second shaft
221 second gear portion
33 third shaft
331 third gear portion
40 rotating electrical machine (power source)
51 bearing
100 power transmission device
S accommodating chamber

The invention claimed is:

1. A power transmission device comprising:
a case including an oil reservoir at a lower portion thereof; and
a first shaft, a second shaft, and a third shaft which are shaft-supported by the case, wherein
the first shaft is connected to a power source and includes a first gear portion which outputs power from the power source,
the second shaft includes a second gear portion which receives power from the first gear portion and which outputs the received power, the third shaft includes a third gear portion which receives power from the second gear portion and which has at least a part immersed in the oil reservoir,
the case includes
an air breather chamber that separates air and an oil in the case and communicates with the atmosphere,
an oil catch tank that reserves an oil raked up by the third gear portion, and
an oil guide that introduces the oil raked up by the third gear portion into the oil catch tank,
the air breather chamber is provided above and near the third shaft,
the oil catch tank is provided above and near the first shaft,
the oil guide is provided above the second shaft, and
a second axis of the second shaft is set at a position higher than a first axis of the first shaft and a third axis of the third shaft, and the second shaft is disposed above an oil in the oil reservoir.

2. The power transmission device according to claim 1, wherein
a total of three shafts, that is, the first shaft, the second shaft, and the third shaft, are disposed as power transmission shafts in the case.

3. The power transmission device according to claim 1, wherein
the case further includes an oil passage that introduces the oil reserved in the oil catch tank into a bearing that supports the first shaft.

4. The power transmission device according to claim 1, wherein
the oil guide is disposed directly above the second axis of the second shaft, and the air breather chamber is not disposed directly above the second axis of the second shaft.

* * * * *